United States Patent
McCartney et al.

(10) Patent No.: US 7,334,608 B1
(45) Date of Patent: Feb. 26, 2008

(54) REMOVABLE SANITARY SEWER FRICTION-FIT PLUG FOR UNWANTED FLUID EXCLUSION

(76) Inventors: Josck Alston McCartney, 11902 NW. 26TH Manor, Coral Springs, FL (US) 33065; Stafford Alston McCartney, 135 Williams Park Rd., Green Cove Springs, FL (US) 32043

( * ) Notice: Subject to any disclaimer, the term of this patent is extended or adjusted under 35 U.S.C. 154(b) by 245 days.

(21) Appl. No.: 11/025,202

(22) Filed: Dec. 29, 2004

(51) Int. Cl.
*F16L 55/10* (2006.01)
(52) U.S. Cl. .......................................... 138/90; 138/89
(58) Field of Classification Search ................. 138/89, 138/90
See application file for complete search history.

(56) References Cited

U.S. PATENT DOCUMENTS

| | | | | | |
|---|---|---|---|---|---|
| 791,351 | A | * | 5/1905 | Malloy | 138/89 |
| 1,674,998 | A | * | 6/1928 | Spang | 138/96 T |
| 2,315,538 | A | * | 4/1943 | Moeller | 215/359 |
| 2,321,667 | A | * | 6/1943 | Foster | 220/802 |
| D178,961 | S | * | 10/1956 | James | D9/439 |
| 2,886,203 | A | * | 5/1959 | Goll | 220/801 |
| 3,675,685 | A | * | 7/1972 | Potter | 138/89 |
| 3,724,273 | A | * | 4/1973 | Awrey | 73/714 |
| 4,998,633 | A | * | 3/1991 | Schneider | 215/311 |
| 5,228,476 | A | * | 7/1993 | Ashcroft | 138/89 |
| 5,558,130 | A | * | 9/1996 | McCabe et al. | 138/89 |
| 5,733,444 | A | | 3/1998 | Johnson | |
| 6,058,977 | A | * | 5/2000 | Hotta | 138/89 |
| 6,062,262 | A | | 5/2000 | Tash | |
| 6,082,410 | A | * | 7/2000 | Pohar | 138/89 |
| 6,135,140 | A | | 10/2000 | Grandinetti | |
| 6,494,463 | B1 | * | 12/2002 | Rank | 277/607 |
| 6,877,529 | B2 | * | 4/2005 | Bernini | 138/89 |

* cited by examiner

*Primary Examiner*—James Hook
(74) *Attorney, Agent, or Firm*—Lawrence J. Gibney, Jr.

(57) ABSTRACT

This device will prevent intrusion of rainwater, groundwater and other unwanted fluids into a sanitary sewer system thereby alleviating the load on the sanitary sewer, collection, transmission and waste water treatment facilities thereby reducing costs.

12 Claims, 3 Drawing Sheets

REMOVABLE SANITARY SEWER FRICTION-FIT PLUG FOR UNWANTED FLUID EXCLUSION

CROSS REFERENCE TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to the plugging of certain drain waste and vent and sanitary sewer maintenance access points with a removable device for the purpose of inhibiting rainwater, surface water, or other undesirable fluids from entering into sanitary sewer collection systems.

B. Prior Art

Other devices relative to storm drains or wastewater systems have been devised primarily to keep debris from entering a man hole such as in Johnson, U.S. Pat. No. 5,733,444. Other examples where drain pipes are plugged exist in Tash, U.S. Pat. No. 6,062,262. Another device dealing with storm drain diverters is Grandinetti, U.S. Pat. No. 6,135,140.

The specific object of the device that is the subject of this particular patent application is to prevent the intrusion of rainwater, surface water or any other unwanted fluids into the sanitary sewer system in order to reduce the load on the waste water collection, transmission and treatment systems.

None of the prior devices perform that particular function.

BRIEF SUMMARY OF THE INVENTION

This is a friction fit plug, which is specifically designed to be inserted into drain waste and vent pipe (hereafter "DWV") and sewer pipe and associated clean-out fittings related to sanitary sewer collection systems.

The purpose of this friction plug is to inhibit infiltration and inflow of surface water or other undesirable fluids into the sanitary sewer collection system via broken or damaged maintenance access points such as cleanout caps and plugs.

The access to the DWV or sewer line is usually a plumbing "clean-out adaptor" "T" or "Y", which is generally capped or plugged and is located at the point or points of connection to the facility being served. A broken, damaged, ill fitting, or missing plug or cap thus facilitates the unnecessary overloading of the sanitary sewer collection, transmission, and treatment systems with rain water or other undesirable fluids.

The friction plug can be easily removed for maintenance and/or cleaning of the pipes and other traditional maintenance. An integral handle is provided to easily install or remove the device. The friction plug allows for traditional smoke and pressure testing of the sanitary sewer collection system with the device in place by means of a check or purge valve, which is installed on the top surface of the device and covers the hole on the top surface of the device. It is anticipated that the device will be manufactured by a blow molding or similar process.

One of the key features of this device is that this friction fit plug can be inserted in the plumbing clean adaptor out "T" or "Y" and allow for pressure or smoke testing. Another key feature is the presence of chevrons and guide rings that are designed to prevent over insertion and to provide an effective seal against unwanted fluids.

A passageway is provided to connect the tapered, hollow center to the top surface of the device. In normal operation the purge valve completely covers the opening created by the connective passageway.

It is anticipated that the device will be constructed from high density polyethylene or similar material that is chemically resistant to the corrosive gasses that exist in a sanitary sewer system.

DETAILED DESCRIPTION OF THE EMBODIMENTS

Figure 1:
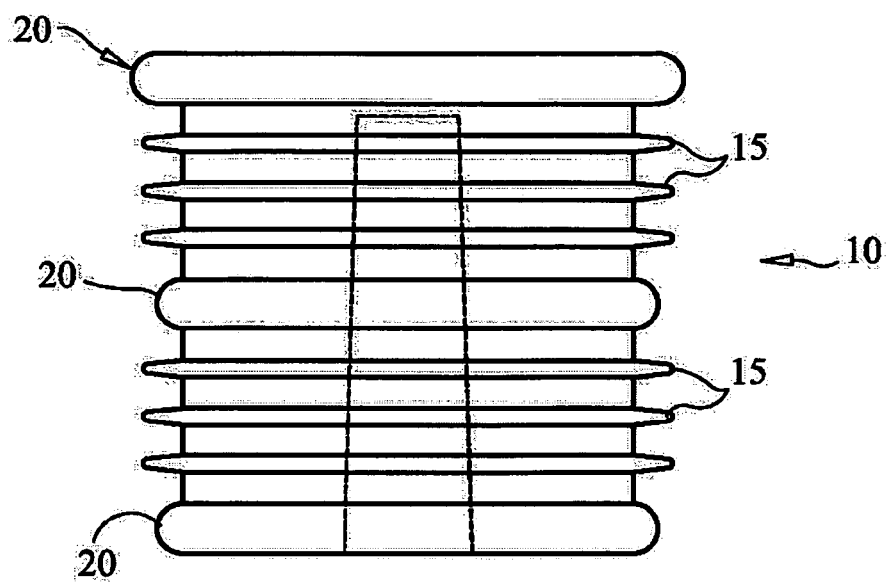
FIG. 1 is a side view of the plug.
Figure 2:
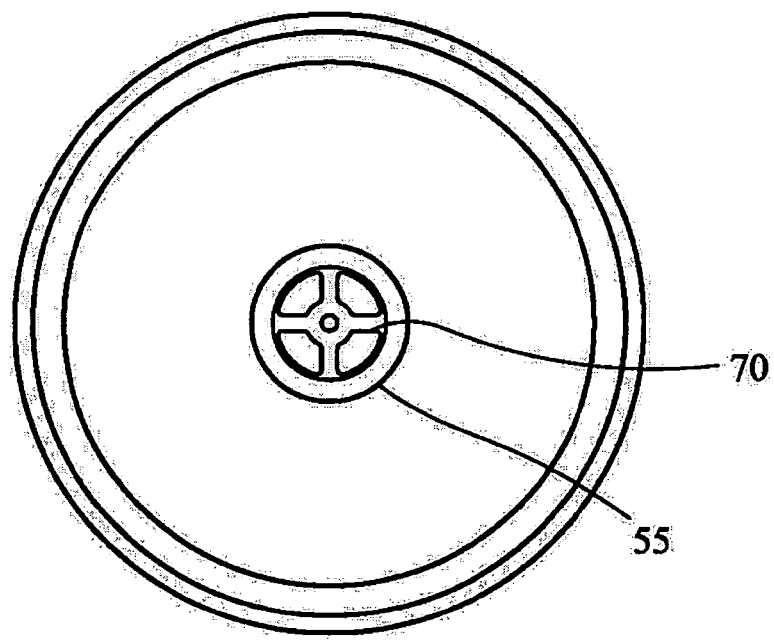
FIG. 2 is a top view of the device.
Figure 3:
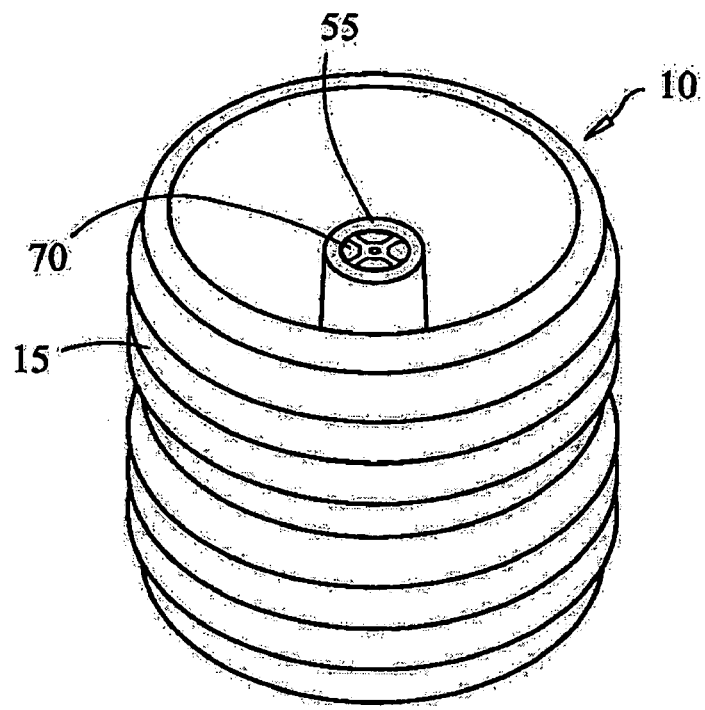
FIG. 3 is a perspective view of the device.
Figure 4:
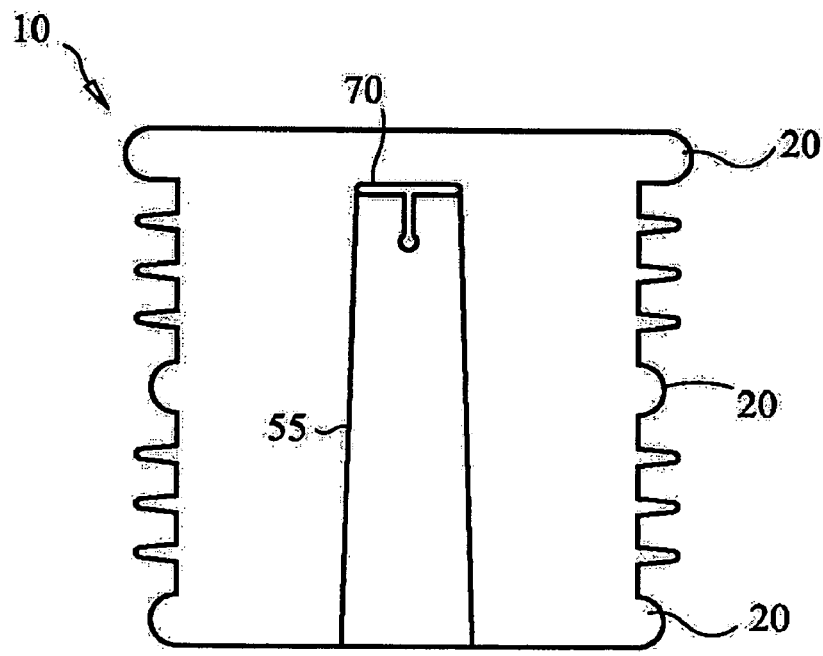
FIG. 4 is a cross sectional view of the device.
Figure 5:
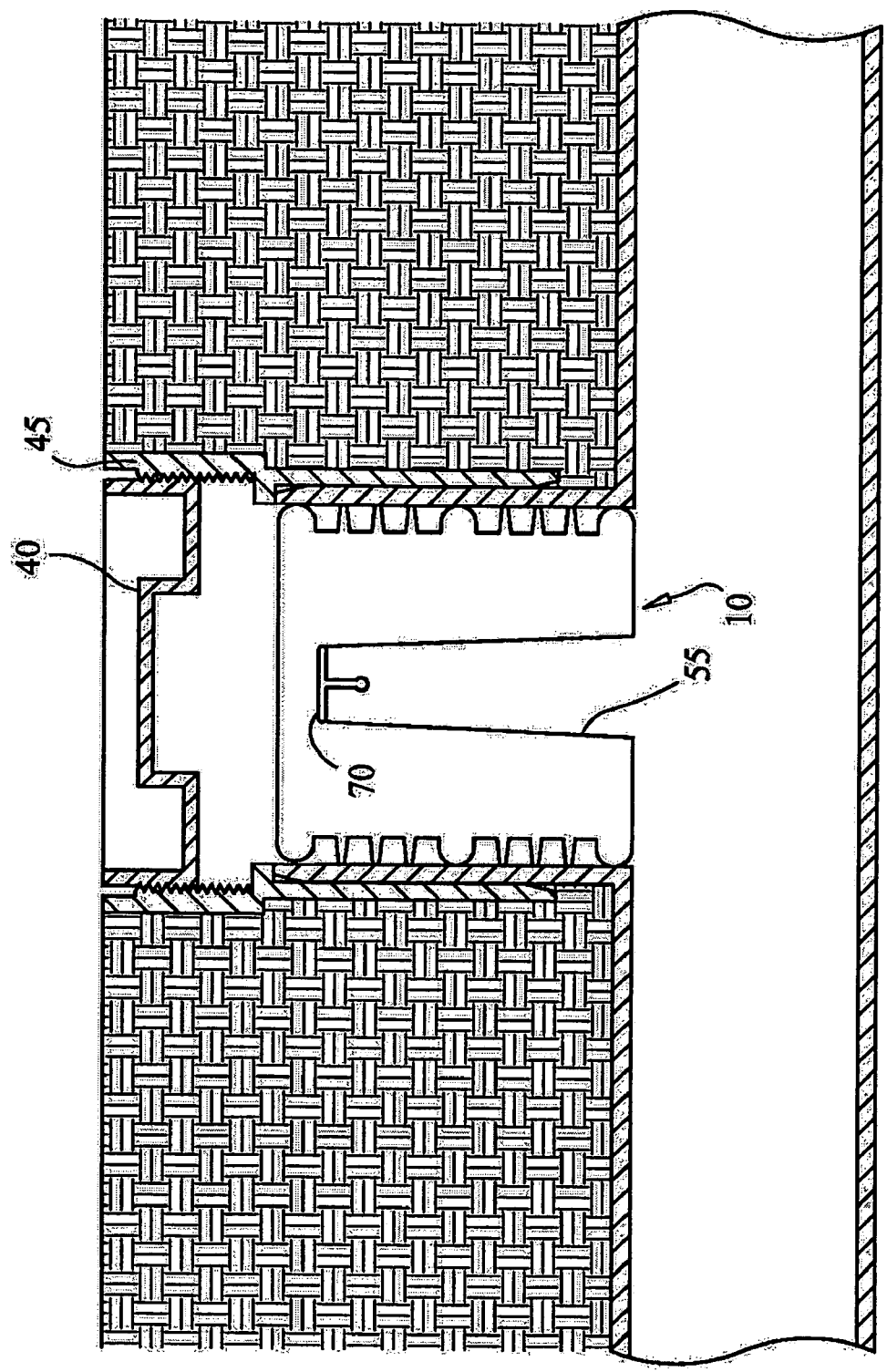
FIG. 5 is a cross sectional view of the device installed in a typically piping system.

This device 10 will be installed in sanitary sewer collection systems and will serve as a means to exclude rain water, surface water and other unwanted fluids from entering the sanitary waste coming from the property being served. FIGS. 1, 4 The intrusion of rainwater or surface water, or other undesirable fluids adds to the load, which is placed on the utilities' wastewater collection, pumping, transmission, waste water treatment, and effluent disposal systems.

In effect the wastewater treatment system is treating rainwater or other fluids that do not require treatment or should not enter the system.

This device 10, if used properly, will result in substantial cost savings to the wastewater utility and will allow the treatment facility to be correctly certified for the appropriate plant capacity thus freeing up additional capacity to be utilized to extend treatment plant useful life or add wastewater plant connections.

The plug 10 is cylindrical and is manufactured from high density polyethylene or similar material.

It is also anticipated that semi rigid plastic may be used although the device should have some degree of elasticity. It is cylindrical and is designed to be an interference fit into the standard plumbing, and sewer pipe used with "clean-out" adaptors "T's" or "Y's" for most homes or other connections to the sanitary system, but allow a free flow of sanitary waste from the home or business. FIG. 4 Other size plugs will be used depending on the specifics of the plumbing or utility systems but all should fit snugly in the pipes.

The typical sanitary waste system is comprised of piping leading from the home or business to the sewer main and eventually to the wastewater treatment facility. Most sanitary waste system are equipped with a cleanout assembly 45, located at the point of connection between the home or business and the sanitary sewer collection system, which allows for maintenance and testing of the system. Additionally the cleanout assembly 45 is equipped with a cleanout plug or cap 40. FIG. 4

The cleanout plug or cap 40 is usually installed at all normal times that the system operates and is only removed during times when access to the system is needed. A cleanout assembly is needed because at certain times access to the system is needed for routine maintenance or to address problems in the system such as blockages.

Occasionally the cleanout cap or plug 40 is damaged accidentally thereby allowing rainwater, surface water and other undesirable fluids to enter the system if this device 10 has not been installed. Without the current device 10 in place the infiltrated fluids would eventually be routed to the sanitary waste system. As has been stated previously this unnecessary intrusion of rainwater or other fluids adds load to the wastewater treatment facility. This additional load is unneeded and unnecessary.

An additional benefit to this device is to prevent other contaminants into the sewer system such as mulch, parts of trees, and other objects that may fall into the system. These contaminants in addition to being unnecessary also have the potential of causing a blockage in the sewer system.

This plug 10 will be inserted into the pipe at the cleanout adaptor, "T" or "Y" below the plug or cap 40. FIG. 4 The plug or cap is necessary in order to access the waste water system for routine maintenance and testing through the cleanout assembly 45. FIG. 4

The plug 10 would fit snugly within the interior of the plumbing, which is installed under the cleanout plug or cap 40 and in the piping 50 which forms part of the cleanout adaptor, "T" or "Y" and carries the waste from the home or business to the wastewater treatment facility. The use of flexible chevrons 15 or pieces of material, which protrude from the respective sides of the device 10, are designed to insure a tight fit against the side of the pipe 50 and prevent over insertion of the device 10. FIG. 4 The plurality of chevrons 15 would be used in order to prevent fluid intrusion and to insure this plug would fit in the pipe systems and sizes for which it is designed.

Additionally the device is constructed with a tapered hollow center 55 that is a multi functional. FIG. 4 The tapered hollow center 55 is designed as an integral handle and allows the required degree of flexibility to be able to insert the device into the pipe through the cleanout assembly 45 by squeezing the sides of the device 10 to insert it. FIG. 4 The tapered hollow center 55 also allows for the inclusion of a purge valve 70 on the top surface of the device that allows the system to be smoke or pressure tested periodically as required without needing to remove the device 10. A thin passageway 70 connects the tapered hollow center 55 to the top surface of the device 10, which accommodates the check or purge valve. In normal operation the purge valve 70 would completely cover the opening on the top surface. The purge valve 70 would prevent the intrusion of rain water yet allow the system to be tested.

From time to time the caps or plugs may be broken or displaced and would lead to the intrusion of rainwater and other undesirable fluids into the system. Additionally the piping should also be tested initially to check the integrity of the system. This testing is typically done by means of a smoke test. Smoke is introduced into the main sewer system and forced in the general direction of the house or business.

Sanitary sewer collection systems may be tested at any given time either for routine maintenance or in the event that a leak or fault is suspected. As the smoke filters through the system it will exit through any breakage in the system. The device 10 in this case is equipped with a purge valve 70, which is located on the top surface of the device 10. FIG. 4 As the smoke filters through the system, it will exit through the purge valve 70 and exit through a broken cracked or missing plug or cap. If the cap or plug 40 is in place and not damaged no smoke will exit the system.

The purge valve 70 is in the nature of a check valve and will only allow the smoke to exit the system but not allow the rainwater to enter in the event that rainwater, and not other unwanted fluids, enters through a broken, cracked or missing plug.

The device 10 will be equipped with a means to connect the bottom of the device and the center of the top surface to insert the purge valve by means of a passageway. It is contemplated that this will occur during the molding or similar manufacturing process. It is contemplated that a thin hollow boring or passageway in the interior of the device will connect the top of the device and the purge valve 70 to the tapered hollow center 55. FIG. 4 The tapered hollow center may occupy from one-third to two-thirds of the interior of the device. This passageway 70 and purge valve is necessary in order to be able to conduct the testing of the system without having to remove the device from its position.

The device 10 would be inserted by squeezing the sides of the device 10 to install it. A feature of the device is that it cannot be over inserted into the pipe. The removal of the device would be accomplished by pulling on the internal conical handle.

In order to achieve insertion and removal the hollowed tapered center 55 is necessary as well as the plurality of chevrons 15 which ensure the tight fit against the sides of the pipe below the clean out adaptor, "T" or "Y".

The invention claimed is:

1. A removable sanitary sewer system friction plug, which is essentially cylindrically hollow in configuration and is inserted into the pipe below the cleanout adaptor, "T" or "Y" of a sanitary sewer system;

said device having a substantially hollow handle firmly connected to the entire interior rim of the bottom opening of the device and tapering upward to substantially the same height as the edge of the top opening of the device;

wherein said handle has a small opening in the top surface;

said handle is positioned in the middle of the plug;

said handle is formed as part of the plug;

said handle has a first end and a second end;

wherein a valve is positioned on the first end of the handle;

wherein the second end of the handle is formed as part of the device;

said handle allows the device to be inserted into the piping system;

wherein rings of material are located on the outside surface of the device and are placed at equal intervals along the outside surface of the device;

wherein said rings of material are separated by chevrons;

said chevrons extend outward from the outer surface of the device to provide a tight fit within the pipe below the cleanout adaptor, "T" or "Y";

wherein the chevrons are made of a flexible material to provide a seal to prevent intrusion of unwanted fluids and to allow ease of insertion or removal of the device;

wherein a purge valve is located on the top surface of the handle and is positioned over the small opening;

said purge valve is a uni-directional valve;

said device is constructed of substantially anti-corrosive material.

2. The device as described in claim 1 wherein the hollow handle occupies approximately one-third to two-thirds of the interior of the device.

3. The device, as described in claim 1 wherein a plurality of chevrons are provided on the outside surface of the device.

4. The device as described in claim 1 wherein a purge valve is positioned over an opening in the top surface of the hollow handle.

5. The device as described in claim 1 wherein it is constructed of neoprene.

6. The device as described in claim 1 wherein it is constructed of rubber.

7. The device as described in claim 1 wherein it is constructed of elastic material.

8. The device as described in claim 1 wherein it is constructed of High Density Polyethylene.

9. The device as described in claim 1 wherein the ring on the top surface of the device is larger in diameter than the other concentric rings to prevent over-insertion of the device.

10. A device for plugging a waste-water drain system which is comprised of:
   a. a substantially hollow cylindrical friction plug;
   wherein the device is inserted into the pipe below the cleanout adapter, "T" or "Y" of a sanitary sewer system;
   wherein a handle for insertion and removal of the plug is provided;
   said handle is formed as part of the device;
   b. a purge valve;
   where the cylindrical friction plug is equipped with a hollow handle connected at the bottom opening and tapering upward toward the top opening;
   said handle has a small opening at the top surface;
   the top surface of the handle is equipped with a purge valve which covers the small opening;
   said purge valve is uni-directional.

11. The device as described in claim 9 wherein the device will allow smoke and pressure testing of the sanitary waste system with the device installed.

12. The device as described in claim 9 wherein a handle has been installed for insertion and removal of the device.

\* \* \* \* \*